(12) United States Patent
De Bruijne et al.

(10) Patent No.: US 7,844,090 B2
(45) Date of Patent: *Nov. 30, 2010

(54) METHOD OF DERIVING A QUANTITATIVE MEASURE OF A DEGREE OF CALCIFICATION OF AN AORTA

(75) Inventors: Marleen De Bruijne, Rotterdam (NL); Mads Nielsen, Dragoer (DK); Claus Christiansen, Morcote (CH); Lars A. Conrad-Hansen, Frederiksberg (DK); Francois B. Lauze, Copenhagen (DK)

(73) Assignee: Nordic Bioscience Imaging A/S, Herlev (DK)

( * ) Notice: Subject to any disclaimer, the term of this patent is extended or adjusted under 35 U.S.C. 154(b) by 14 days.

This patent is subject to a terminal disclaimer.

(21) Appl. No.: 11/921,372

(22) PCT Filed: Jun. 2, 2006

(86) PCT No.: PCT/EP2006/005317

§ 371 (c)(1), (2), (4) Date: Feb. 13, 2009

(87) PCT Pub. No.: WO2006/128729

PCT Pub. Date: Dec. 7, 2006

(65) Prior Publication Data

US 2009/0216094 A1 Aug. 27, 2009

(51) Int. Cl.
*G06K 9/00* (2006.01)
*G01T 1/36* (2006.01)

(52) U.S. Cl. .......................... 382/128; 382/274; 378/46

(58) Field of Classification Search ................ 382/100, 382/128, 129, 130, 131, 132, 133, 134, 168, 382/181, 199, 203, 220, 224, 232, 260, 274, 382/276, 286, 292, 305; 606/322; 378/64, 378/28, 140; 424/677; 514/2; 604/102.01
See application file for complete search history.

(56) References Cited

U.S. PATENT DOCUMENTS 5,827,231 A * 10/1998 Harada .................... 606/194

(Continued)

OTHER PUBLICATIONS

L.A. Conrad-Hansen et al., "Quantizing Calcification in the Lumbar Aorta on 2-D Lateral X-Ray Images", *Medical Imaging 2005: Image Processing,*, Proc. of SPIE, vol. 5747, pp. 1341-1347 (2005).

(Continued)

*Primary Examiner*—Seyed Azarian
(74) *Attorney, Agent, or Firm*—Edwards Angell Palmer & Dodge LLP; Peter C. Lauro, Esq.; Melissa Hunter-Ensor, Esq.

(57) ABSTRACT

A method of deriving a quantitative measure of a degree of calcification of a blood vessel such as an aorta by processing an image such as an X-ray image of at least a part of the blood vessel containing said calcification comprises: taking a starting set of digital data representative of an image of at least part of a blood vessel containing a calcification set against a background; estimating the boundary of the calcification; using inpainting to replace digital data in said starting set representing the calcification with data extrapolating the boundary of the background to extend over the area of calcification, and so generating an inpainted set of digital data; and computing the difference between the starting set of digital data and the inpainted set of digital data to obtain a quantitative measure of the degree of calcification of the blood vessel.

29 Claims, 8 Drawing Sheets

U.S. PATENT DOCUMENTS

| | | | |
|---|---|---|---|
| 6,372,264 B1 * | 4/2002 | Dixon | 424/677 |
| 6,551,990 B2 * | 4/2003 | Giachelli et al. | 514/2 |
| 6,679,861 B2 * | 1/2004 | Yozu et al. | 604/102.01 |
| 6,790,823 B1 * | 9/2004 | Simonet et al. | 514/2 |
| 6,977,987 B2 * | 12/2005 | Yamashita et al. | 378/64 |
| 7,046,835 B2 * | 5/2006 | Launay et al. | 382/132 |
| 7,230,429 B1 * | 6/2007 | Huang et al. | 324/322 |

OTHER PUBLICATIONS

Marleen de Bruijne, "A Pattern Classification Approach to Aorta Calcium Scoring in Radiographs", Proceedings of the ICCV Workshop on Computer Vision for Biomedical Image Applications: Current Techniques and Future Trands, Lecture Notes in Computer Science 3765, pp. 170-177 (Oct. 21, 2005).

L.A. Contrad-hansen et al., "Prediction of the Location of the Lumbar Aorta Using the First Four Lumbar Vertebrae as a Predictor", *Proceedings of the SPIE*, vol. 5370 (Feb. 16, 2004).

* cited by examiner

METHOD OF DERIVING A QUANTITATIVE MEASURE OF A DEGREE OF CALCIFICATION OF AN AORTA

BACKGROUND OF THE INVENTION

The present invention relates to a method of deriving a quantitative measure of a degree of calcification of a blood vessel, e.g. an aorta.

Inpainting is a technique that originates from retouching paintings where one wants to recreate lost or damaged structures in a legible way. Digital inpainting uses spatial or frequency information to restore partially damaged/removed images.

Various inpainting techniques are known that enable image restoration, in particular for photographs, videos and films.

It is known to detect and inpaint small regions in mammograms that possibly define a micro calcification to enable detection of calcified regions. Subsequently, features such as the average and the standard deviation of intensity values are extracted from both the pre- and the post-inpainting regions. A classifier is trained to distinguish between true micro calcifications and false positives based on the extracted features. The comparison between a region and its inpainting is used to enable detection. Thus a binary decision of whether a region is abnormal, i.e. different from its surroundings, is made.

There are, however, no methods available at present that use inpainting to give more than a basic indication of the presence of a calcification. In the present invention, it has been realised that such a method may be useful in the diagnosis of various diseases, for example, atherosclerosis.

Atherosclerosis is a process in which deposits of fatty substances, cholesterol, cellular waste products, calcium and other products build up in the inner lining of an artery.

Calcifications in the abdominal aorta, or at other sites such as the coronary arteries, are an important predictor for assessing cardiovascular morbidity and mortality.

Previous known methods of providing a reproducible measurement of the amount of calcified deposits in the aorta include several automatic and semi-automatic calcium scoring methods for use with computed tomography (CT) scans. CT scans are useful when used to identify and quantify atherosclerosis. However, the expense involved in CT scans prevents this method from being used in more routine diagnoses.

A previous known approach involves manually quantifying the severity of aortic calcifications in radio-graphs by providing an antero-posterior severity score. For this score, as shown in FIG. 2, the lumbar part of the aorta is divided in four segments adjacent to the four vertebra L1-L4, and the severity of the anterior and posterior aortic calcification are graded individually for each segment on a 0-3 scale. The results are summed in a composite severity score ranging from 0 to 24. A manual scoring system as described has been successfully applied in epidemiological studies but this method does not allow for describing subtle changes in disease progression and the method is both labour-intensive and prone to inter- and intra-observer variations.

The inventors of the present invention have recognised that it would be desirable to provide an automated calcification detection scheme that allows for automatic scoring according to current semi-quantitative standards as well as for continuous and more precise quantification.

SUMMARY

The present invention seeks to provide a more accurate measure of the degree of calcification of the aorta or more generally any blood vessel using techniques to locate areas of calcification within an aorta and various inpainting techniques to assess the degree of calcification. There is accordingly provided a method of deriving a quantitative measure of a degree of calcification of a blood vessel by processing an image of at least a part of the blood vessel containing said calcification, which method comprises:

taking a starting set of digital data representative of an image of at least part of a blood vessel containing an area of calcification, said area of calcification being set against a background area;

using an inpainting method to replace digital data in said starting set of digital data representing the calcification with data extrapolating the background to extend over the area of calcification, and so generating an inpainted set of digital data; and computing the difference between the starting set of digital data and the inpainted set of digital data to obtain a result representative of the degree of calcification of the blood vessel.

The method may comprise the preliminary step of detecting calcifications in a blood vessel by predicting the location of the blood vessel; based on this prediction and a prior model of calcification distribution in such a blood vessel, calculating the probability of calcifications being located at a position within the blood vessel; and using these calculations to estimate the location of an area of calcification in the blood vessel.

The method may comprise the preliminary steps of estimating a boundary of the area of calcification, wherein the step of inpainting comprises replacing digital data within the boundary with data extrapolating the background outside the boundary to extend over the area within the boundary. Generally inpainting propagates data values in said boundary region into replacement data values for the selected area of calcification. Inpainting methods are described in numerous previous publications including U.S. 2004/0164996, U.S. Pat. No. 6,587,592, U.S. 2003/0012453 and U.S. 2004/0161153, all of which are hereby incorporated by reference.

The method of the invention may further comprise:

calculating a signal to noise ratio along the boundary of the calcification between the inpainted set of digital data and the starting set of digital data;

increasing the area within the boundary, and repeating the step of calculating the signal to noise ratio along the boundary; and repeating the steps of increasing the area within the boundary and then calculating the signal to noise ratio between the inpainted set of digital data and the starting set of digital data along the boundary until the rate of increase in the signal to noise ratio reaches a pre-selected value.

Such methods may further comprise calculating the average intensity difference between the inpainted set of digital data and the starting set of digital data, wherein the difference is representative of the degree of calcification of the blood vessel.

Methods of inpainting suitable for use include all those currently known in the art or which may be developed hereafter including without limitation TV inpainting, harmonic inpainting and average inpainting.

Such methods may be applied to any blood vessel but preferably to an artery, particularly the aorta.

The invention may be embodied in a preprogrammed computational device or an instruction set for such a device adapted to carry out the above method.

BRIEF DESCRIPTION OF DRAWINGS

Embodiments of the present invention will hereinafter be described, by way of example, with reference to the accompanying drawings, in which.

DESCRIPTION OF PREFERRED EMBODIMENTS

To generate a quantitative measure of the degree of calcification in the aorta the following steps can be taken:

1. Obtain lateral 2-D x-ray images of the spine.
2. Estimate the location of the aorta.
3. Detect calcified areas.
4. Obtain a quantitative measure of the degree of calcification.
5. Output the result.

The present invention is primarily concerned with Steps 2, 3 and 4, the actual process involved in detecting calcified areas of an aorta and obtaining a quantitative measure of the degree of calcification.

Methods of obtaining x-ray images are well known. This step will therefore not be described herein.

In the described embodiment, lateral 2-D x-rays are used to provide a cost-efficient way of delivering reliable and easily reproducible data which may be used to extract information regarding the degree of calcification of the aorta.

Calcifications usually can be depicted in x-rays as small and usually elongated bright structures. One of the problems in automatic detection of calcifications is that many other structures in the image, e.g. bone and image artefacts, all have similar appearances. If the location of the aorta is known in the image the detection becomes easier. However, this is typically not feasible as the non-calcified parts of an aorta are not visible in x-rays.

The present invention takes advantage of the strong correlation between the shape and position of the aorta and the shape and position of the spine, which is much easier detected in the image. In the present invention, the pixel classification on the basis of local intensity features is combined with a spatially varying calcium prior that is dependent on the position of a pixel with respect to the spine. The spatially varying prior is derived from a statistical model of combined spine and aorta shape variation, together with a model of how the calcium is distributed within the aorta. The method requires the localisation of the corner and midpoints of the first four lumbar vertebrae.

Figures 1, 2:
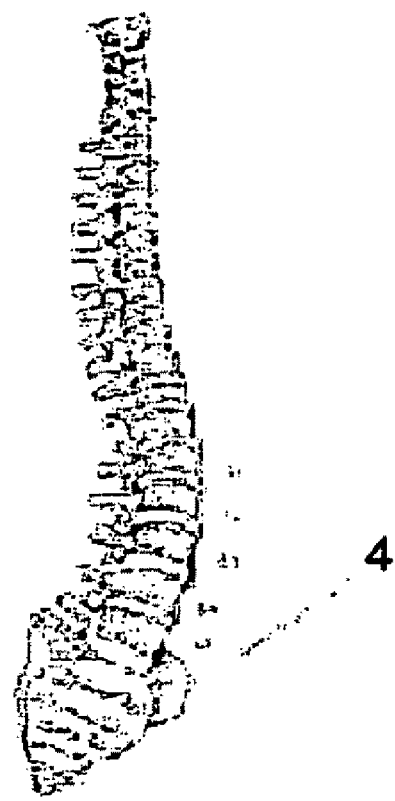
FIG. 1 shows a spinal column with the lumbar region indicated.
FIG. 2 shows an indexing system of a semi-quantitative method of the prior art.

The region of interest for which x-ray images are required is the lumbar region, denoted by L1-L4 in FIG. 1. As a result of the proximity of the thoracic region of the aorta to the rib cage, x-ray images taken from the thoracic region are generally contaminated with some noise. Therefore, the lumbar region is used. Furthermore, bifurcation of the aorta with the first parts of the common iliac arteries most commonly occurs at L4, which restricts the region of interest to the first four lumbar vertebrae. The bifurcation causes surges in the blood stream, which in turn contribute to the calcification process, so that calcific deposits primarily occur at L4 followed by L3. Therefore, if calcific deposits are found in the area of the aorta corresponding to L2, then the aortic region corresponding to the lower lying vertebrae is almost always even more calcified.

Typically, distribution of calcification in the aorta is not uniform. The quantity of plaque increases near the aortic bifurcation, and as a result of projection imaging the majority of plaque is visible along the anterior and posterior aortic walls and not in between.

If a large training set of example x-ray images were taken, with annotations depicting the aorta and calcifications, the probability of the presence of calcium in each pixel could be estimated by labelling all calcified pixels with a 1, and all non-calcified pixels as 0. Then, by warping all images of aortas on top of each other, it would be possible to calculate an approximation of an average calcified aorta.

If the above training set is limited, the above procedure will lead to incorrect results; pixels in an aorta may coincidentally have a very high or low probability of being calcified. In a limited training set, the probability of the presence of calcium in each pixel can be approximated by modelling the cross-sectional and longitudinal presence of calcium separately.

In a set of labelled training images, the part of the aorta adjacent to the first four lumbar vertebrae is selected and intensity profiles are sampled perpendicular to the axis of the aorta, i.e. reaching from the anterior to the posterior wall. All profiles are then normalised so that they are of equal length and averaged to form a cross-sectional calcium prior distribution. For each image, one longitudinal profile is formed by summing the values in each individual intensity profiles. An average longitudinal profile is computed by normalising the length and averaging the longitudinal profiles of all images.

Figures 3A, 3B:
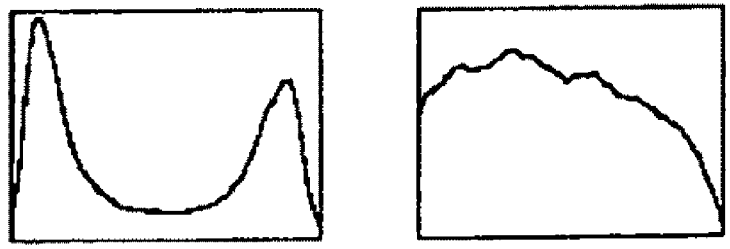
FIGS. 3A and 3B show respectively a cross-sectional profile and longitudinal profile of calcium distribution inside an aorta.

For a given aorta shape $S_i$, a calcium prior probability map $P(\omega|S_i)$ can then be constructed by sweeping the cross-sectional prior profile along the axis, modulated with the longitudinal profile. In these circumstances, the prevalence of calcium is higher at the aortic walls and near the bifurcation. The cross-sectional profile is shown in FIG. 3A and the longitudinal profile in FIG. 3B.

In general, the shape and location of the aorta will not be known a priori. Since the aortic walls are only visible if calcium is present, automatic aorta segmentation can not be used as a first step in attempting to detect the calcific regions. However, the shape and location of the aorta are strongly correlated with the shape and location of the spine, so it is possible to use the shape of the spine in predicting the shape of the aorta.

The present invention uses not just a single prediction of the aorta but a model of aorta position and shape variation. Any kind of shape model from which samples can be drawn may be used. A popular shape model is the linear point distribution model (PDM) as described in Cootes and Taylor—this models the object shape variations observed in the training set.

In PDMs, shapes are defined by the coordinates of a set of landmark points which correspond between different shapes. That is, a point on one shape denotes the same anatomical position as the "same" point (the point having the same number in the sequence) in another shape. A collection of training shapes are aligned using, for example, Procrustes analysis, to minimise the sum of squared difference between shape vectors. A principal component analysis (PCA) of the aligned shapes yields the "modes of shape variation" which describe a joint displacement of all landmarks. Each shape can then be approximated by a linear combination of the mean shape and these modes of variation. Usually only a small number of modes are needed to capture most of the variation in the training set.

To construct a conditional shape model of the aorta given the spine, the spine and aorta landmarks are combined into one shape vector. The Procrustes alignment must be done only on the spine part of the combined shapes.

The distribution $P(S_1|S_2)$, the probability distribution of the expected aorta shape and pose $S_1$ for a given spine $S_2$, can then be modelled as a Gaussian condition density $$P(S_1|S_2) = N(\mu, K)$$

With average $$\mu = \mu_1 + \Sigma_{12}\Sigma_{22}^{-1}(S_2 - \mu_2)$$

and covariance matrix $$K = \Sigma_{11} - \Sigma_{12}\Sigma_{22}^{-1}\Sigma_{21}$$

where $\mu 1$ and $\mu 2$ are the mean aorta and spine shapes respectively, S2 is the the vector of hand-annotated landmark positions of vertebrae seen in an x-ray, and $\Sigma_{ij}$ are obtained from the covariance matrix of the combined model $$\Sigma = \begin{bmatrix} \Sigma_{11} & \Sigma_{12} \\ \Sigma_{21} & \Sigma_{22} \end{bmatrix}$$

as $$\Sigma_{ij} = \frac{1}{n-1}\sum_n (S_{in} - \overline{S}_i)(S_{jn} - \overline{S}_j)^T$$

Usually, $\Sigma 22$ is not invertible because of multi-collinearity in the landmark positions and it may be unreliable as a result of chance covariance in a limited training set. Some regularisation is therefore required. One option is to replace $\Sigma 22$ by $\Sigma 22 + \gamma l$, where y is a positive and a typically small constant and l is the identity matrix. As $\gamma$ tends to infinity, the influence of the spine decreases; the remaining model is the original aorta model that describes the shape variation in the aorta independent of the spine.

Figures 4A, 4B, 4C:
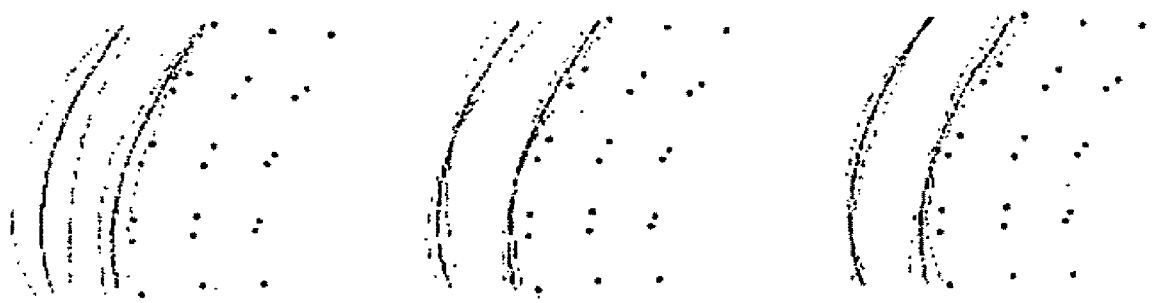
FIGS. 4A, 4B and 4C show three modes of variation of the aorta given the known positions of vertebrae corner points and mid-points.

An example of the different modes of variation of this conditional shape model is shown in FIGS. 4A, 4B and 4C where the mean aorta shape is given in black 6, and the mean shape±3 standard deviations in grey 8. FIGS. 4A, 4B and 4C show the effect of varying a single mode of variation between the mean shape plus and minus 3 standard deviations (the grey lines). The first, second and third largest modes of variation are shown respectively in FIGS. 4A, 4B and 4C.

Having obtained probabilistic models for the location of the aortic walls and for the distribution of calcium within the aorta, it is possible to predict the location of calcific deposits in the image.

To derive a spatial calcium prior, the aorta shape distribution is represented by a random sample set S of N shapes drawn from a Gaussian conditional shape model. Each shape defines a probability distribution of calcium given the shape, and the probability distribution due to the shape collection is simply the average of all N individual probability maps:

$$P(\omega|S) = \sum_i P(\omega|S_i)p(S_i)$$

An initial classification $C^0$, based on appearance information alone without above spatial information, is obtained using a pixel classifier trained to distinguish between calcium and background pixels on the basis of local image descriptors. In this case, the pixels are described by the outputs of a set of Gaussian derivative filters at multiple scales, and a k nearest neighbour (k–NN) classifier is used for probability estimation. The probability that a pixel with feature vector x belongs to class $\omega$ is given by $$P(\omega|x) = \frac{k_\omega}{k}$$

where $k_\omega$ among the k nearest neighbours belong to class $\omega$. The initial labelling $C^0$ is the soft labelling based on pixel appearance alone $$C^0(j, c) = P(\omega_c|x_j)$$

which defines the probabilities for each of the classes c occurring in each pixel j.

The spatial prior can subsequently be applied as a multiplication of the soft classification $C^0$ with a calcium prior map as obtained from a shape sets. The spatial prior defines for each pixel the probability of being calcium, dependent only on the location in the image with respect to the spine shape. The probability from the pixel classifier defines the probability of a pixel being calcium, judged on its appearance alone. The multiplication combines the two to enable the use of two different sources of information which are both relevant.

Figures 5A, 5B, 5C, 5D:
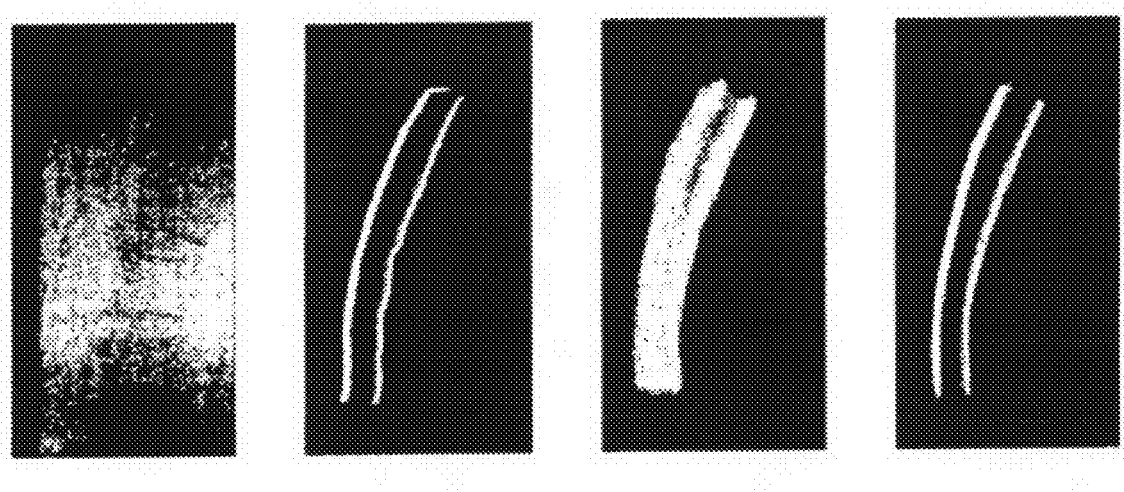
FIGS. 5A shows an original inverted x-ray image of part of a spine and an aorta.
FIG. 5B shows a calcium probability map compiled from a manually annotated aorta.
FIG. 5C shows a calcium probability map compiled from 50 random samples using the aorta conditional shape model.
Figures 6A, 6B, 6C, 6D, 6E, 7A, 7B, 7C, 7D, 7E, 8A, 8B, 8C, 8D, 8E:
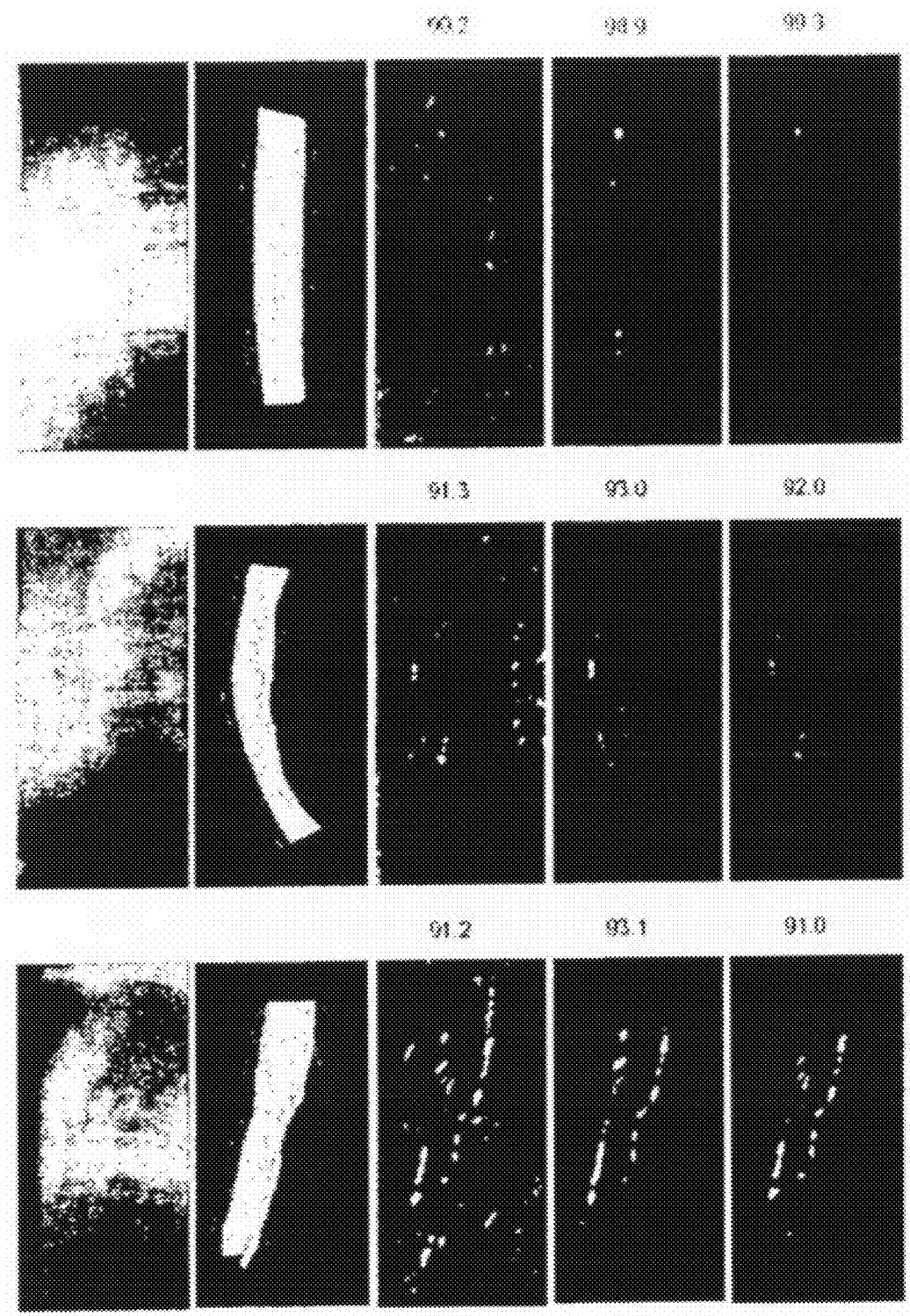
FIGS. 6A to 6E to 8A to 8E show examples of classifications obtained for images of varying degrees of calcification.

FIG. 5A shows an x-ray of a spine and aorta where calcific areas can just be made out. FIG. 5B shows a calcium probability map derived from a manual annotation of the location of the aorta based on an expert viewing the x-ray. FIG. 5C shows a calcium probability map made up of 50 random samples of the aorta conditional shape model described above. In this it can be seen that the probable areas of calcification appear to coincide with the manual annotation of the aorta by an expert shown in FIG. 5C.

As can be seen from FIG. 5C, the spatial prior that can be derived directly from the aorta conditional shape model is fairly broad, reflecting a large uncertainty in the estimate of the location of the aortic walls that was derived only from prior knowledge on the location and shape of the spine. However, if a likely calcified pixel is found, that pixel forms evidence that one of the aortic walls is near that pixel, and one would then expect to find more calcified pixels along the same aortic wall. Therefore, and as described in further detail below, calcium as detected by pixel classification can be used to update the estimate of the aorta.

The aim is to find an image labelling C which is consistent with both the the image I and a prior shape model P(S). To achieve this, first the joint posterior probability distribution P(C,S|I) is obtained for the labelling C and a set of shape samples S and then is marginalised over S.

To perform this joint optimisation, one can use an iterative procedure:
Start with an initial labelling estimate $C^0$ and shape set $S^0 = \{S_1, S_2, \ldots S_N\}$ sampled randomly from the shape prior
1. Sample $S^t$ from $P(S|C^{t-1}, I, S^{t-1})$
2. Set estimate $C^t = \arg\max_C P(C|I, S^t)$ In the first step, a new shape set $S^t$ is sampled from the current shape set $S^{t-1}$ using likelihood weighting based on the current classification estimate. The estimate of aorta shape is thus updated with the class label information. In the second step, the classification estimate is updated with the shape prior from the new shape set. In this way, the statistical classification is moderated with prior information from a shape model, whereas the variance in this shape prior decreases as image evidence for preferring some shapes above others is accumulated.

In step 1, the shape set is updated using importance sampling and diffusion. Each shape $S_i$ is associated with a class probability map $P(\omega|S_i)$ which defines the probabilities for each of the classes occurring in each pixel, as described above. The shapes $S_i$ are then assigned an importance weight $w_i$ which reflects the degree of similarity between the current estimate of calcium probabilities and the calcium distribution that would be expected from the current shape. One possibility is to use the inner product between the two probability maps, as in:

$$w_i = \left[ \frac{1}{Z} \sum_j \sum_c C^{t-1}(j,c) P(\omega_{cj}|S_i) \right]^\alpha$$

where j are the pixels in the shape template (the image pixels that are covered by the shape template $S_i$), Z is a normalisation factor which corrects for differences in template size, α is a tunable parameter controlling the speed of convergence of the algorithm, $C^{t-1}$ is the current estimate of the probability that the pixel j belongs to the class $\omega_c$, and $P(\Omega_{cj}|S_i)$ is the probability that a pixel j is of class $\omega_c$, given the aorta shape $S_i$.

A new shape set S' is generated from the current shape set $S^{t-1}$ using weighted sampling with replacement according to above weights, and subsequently noise is added to the shapes that were selected multiple times in order to explore the solution space around these shapes.

To simplify optimisation, in step 2 it is assumed that the two individual class probabilities, based on appearance and on position with respect to shape, are independent. The new classification estimate is then given by the multiplication of the initial classification estimate with the current shape prior.

$$C^t(j,c) = P(\omega_c|x_j) P(\omega_{cj}|S^t)$$

In this two-step iterative process, successful shapes multiply and shapes representing aortas in non-calcified regions will vanish unless all other shapes are without calcium as well. Thus, the distribution of shape samples that make up the calcium probability map "condenses" in the presence of consistent image evidence for calcifications. This leads to a more peaked probability density and a more precise estimate of the location of the aortic walls. If no calcifications are detected, the condensation is much slower, which reduces the risk of false positives that could be caused by a too strong spatial prior.

An example of a calcium probability map after iterating using the expression above as weights is given in FIG. 5D.

The classification estimates as used during optimisation are soft classifications, giving the vector of probabilities for each pixel. As the final classification estimate, a hard classification may be obtained from the probabilistic classification C' by selecting an appropriate threshold with the desired sensitivity/specificity trade-off.

Leave-one-out experiments were performed on 87 lateral spine radiographs taken from a combined osteoporosis-atherosclerosis screening program. The dataset was diverse, ranging from uncalcified to severely calcified aortas. The original radiographs were scanned at a resolution of 0.1 mm per pixel and were inverted for better visibility of calcific deposits. A medical expert outlined all calcifications adjacent to vertebrae L1 through L4 manually and also placed 6 points on each vertebra as is routinely done in vertebral morphology studies.

Before further analysis the images were normalised to zero mean and unit variance. The appearance features used include the original image and the derivatives up to and including the third order computed by convolution with derivatives of the Gaussian kernel at three different scales (1, 4.5, and 20 pixels). Training pixels were selected randomly from a region of interest including the aorta and its surroundings. The set of samples was normalised to unit variance for each feature, and k-NN classification was performed with an approximate k-NN classifier with k=25. In all cases, results reported are accuracies of hard classification with an overall optimal threshold that is kept constant for all 87 images.

In the conditional shape model, 6 manually placed landmarks on each of the vertebrae are used and 50 aorta landmarks are selected on each aortic wall by equidistant sampling along the manual outlines. The first 5 modes of shape variation are selected for the conditional shape model, $\gamma = 10^{-1}$ is used for regularisation, and N=100 aorta shapes are sampled randomly from the model to form the calcium prior probability map. The diffusion kernel applied during particle filtering is proportional to the shape model with 30% of original variance, and the factor determining the speed of convergence was chosen as α=2. 10 Iterations were performed in the experiment with iterated resampling.

The pixel classification alone yields an average accuracy, defined as the percentage of correctly classified pixels in a region of interest surrounding the aorta, of 96.7%. Combining this with the spatially varying prior based on the manually drawn aorta shape and iterative filtering results in a seemingly small, but significant (p<0.001 in a paired t-test) improvement to 96.9%.

Three different examples of classifications obtained for images of varying degree of calcification are shown in FIGS.

6 to 8. Each row gives the different results for one image. That is, FIGS. 6A to 8A show the original x-ray image, inverted for improved visibility of calcium. FIGS. 6B to 8B show a manual segmentation of the image. FIGS. 6C to 8C show the pixel classification alone. FIGS. 6D to 8D show the pixel classification combined with calcium prior for the manually segmented aorta. And finally, FIGS. 6E to 8E show the pixel classification combined with calcium prior from the conditional shape model after 10 iterations of joint optimization. These final images are the ultimate aim of this automated system. As can be seen, these do not differ significantly from the results achieved from the manual segmentation.

In the above described methodology, the results of a standard pixel classification were improved by combination with a spatially varying prior. The assumption underlying the proposed combination by multiplication is that the two individual probabilities, based on appearance and on position with respect to the spine, are independent. If this is not the case, modelling appearance and position features together in one k–NN classification with appropriate scaling of features is more appropriate.

Information on the location of the calcifications may be used in the quantifying the degree of calcification by, for example, counting the number of calcified pixels, or calculating the percentage of calcified pixels in the region adjacent the L1-L4 of the vertebrae.

Having located the aorta and subsequently detected the calcified regions of interest, the next step is to inpaint the region of interest.

Inpainting is a known technique that originates from retouching paintings to recreate lost or damaged structures in a legible way. The term "Inpainting" is derived from fusing the words "Image" and "Interpolation" together. Three different variations of inpainting are herein described, TV inpainting, harmonic inpainting and average inpainting. TV inpainting is used for its ability to preserve structures to some extent, whereas harmonic inpainting is used as it provides much smoother solutions. The general Bayes' formulation of inpainting can be expressed as:

$$p(u|u_0) = \frac{p(u_0|u)p(u)}{p(u_0)} \propto p(u_0|u)p(u)$$

since $\mu_0$ is known.

The model term $p(\mu|\mu_0)$ models the data formation process. It can be assumed that the observed image $\mu_0$ is obtained from a clean image u corrupted by additive zero-mean Gaussian noise spatially uncorrelated and stationary, with standard deviation $\sigma$ outside the hole $\Omega$, and that the data inside $\Omega$ has been totally lost. Therefore the model of acquisition degradation is given by $$p(u_0|u) = c_1 e^{-\sum_{x \in R \setminus \Omega} \frac{(u(x)-u_0(x))^2}{2\sigma^2}}$$

where C1 is the normalising constant. The prior term $p(\mu)$ is usually difficult to find since it models the probability that a given array of pixel values represents a meaningful image. In the absence of texture, some form of smoothness for images is assumed, i.e. the variation of pixel values around a given pixel location should be small. Therefore, a discrete gradient operator, $\nabla\mu(x)$ encoding the local variations of the image around a given pixel location can be introduced.

The basics of TV inpainting will now be described. In order to enforce a reasonable smoothness, a Laplace distribution is assumed on all values, and the following prior is obtained:

$$p(u) = c_2 e^{-\sum_{x \in R} \frac{|\nabla u(x)|}{\mu}}$$

where $c_2$ is a normalising constant and $\mu\sqrt{2}$ the standard deviation. Using Maximum A Posteriori (MAP) criterion, taking $-\log(\ )$ of each term, and then shifting to a continuous formulation, $\mu$ can be found by minimizing the following energy expression:

$$E(u) = \frac{1}{2\sigma^2}\int_{R/\Omega}(u-u_0)^2\,dx + \frac{1}{\mu}\int_R |\nabla u|\,dx$$

To make the integration boundaries equal, if $\chi$ denotes the function $\chi(x)=0$ if $x \in \Omega$, $\chi(x)=1$ otherwise, and $$\lambda = \frac{\sigma^2}{\mu}.$$

The resulting energy expression can be written as $E(\mu) = \int_R \chi(\upsilon - \upsilon_0)^2\,dx + \lambda\int_R |\nabla\mu|dx.$ Having surpassed the problem with the integration boundaries, it is feasible to use the calculus of variations, so that a minimiser $\mu$ for the energy is given by the following Euler-Lagrange equation $$\frac{\partial E}{\partial u} = \frac{\partial F}{\partial u} - \frac{\partial}{\partial x}\frac{\partial F}{\partial x \partial u_x} - \frac{\partial}{\partial y}\frac{\partial F}{\partial y \partial u_y}$$

where $F(\mu,\mu_x,\mu_y) = \chi(\mu-\mu_0)^2 + \lambda\sqrt{\mu_x^2 + \mu_y^2}$, so that:

$$\frac{\partial E}{\partial u} = 2\chi(u-u_0) - \lambda\frac{u_{xx}u_y^2 - 2u_x u_{xy} + u_{yy}u_x^2}{(u_x^2+u_y^2)^{\frac{3}{2}}} = 0$$

This scheme can be made discrete using gradient descent. However, it cannot be proven to yield a unique solution. A more elegant solution can be found by introducing the divergence of a vector field shown in figures A, B and C. A vector field on $R^2$ is a map that attaches at every point P(x, y) (shown in figure x) a vector $$\overline{\upsilon}(P) = \upsilon(x,y) = \begin{pmatrix} \upsilon_1(x,y) \\ \upsilon_2(x,y) \end{pmatrix}$$

The divergence of $\overline{\upsilon}$ is given by:

$$div\overline{\upsilon} = \nabla\cdot\overline{\upsilon} = \frac{\partial \upsilon_1}{\partial x} + \frac{\partial \upsilon_2}{\partial y}$$

and expresses at a given point P, the local behaviour of the field.

Figure 9:
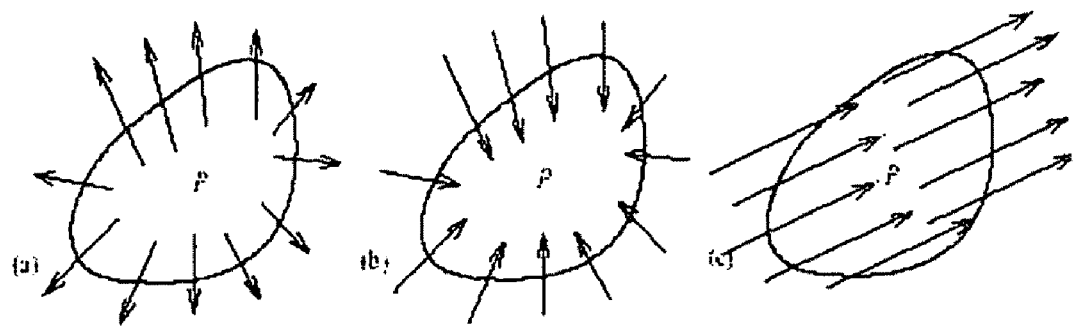
FIG. 9 shows an illustration of divergence at P resulting in varying densities of particles as described in the present invention.

As shown in FIG. 9A, where there is positive divergence of P, the vector field diverges in the neighbourhood of P and the density of particles in the field decreases. Similarly, as shown in FIG. 9B, where there is negative divergence, the vector field converges in the neighbourhood of P and the density of particles increases. Finally, where there is no divergence at P, as shown in FIG. 9C, the density of particles remains constant.

A natural divergence term therefore appears as:

$$\frac{\partial}{\partial x}\frac{\partial F}{\partial u_x} + \frac{\partial}{\partial y}\frac{\partial F}{\partial u_y} = div\begin{pmatrix}\frac{\partial F}{\partial u_x}\\ \frac{\partial F}{\partial u_y}\end{pmatrix}$$

which in the case of TV inpainting corresponds to the term:

$$div\begin{pmatrix}\frac{u_x}{\sqrt{u_x^2+u_y^2}}\\ \frac{u_y}{\sqrt{u_x^2+u_y^2}}\end{pmatrix} = div\left(\frac{\nabla u}{|\nabla u|}\right) = 0, \lambda = \frac{\sigma^2}{\mu}$$

so that the following Euler-Lagrange Partial Differential Equation (PDE) can be solved:

$$\chi(u-u_0) - \lambda div\left(\frac{\nabla u}{|\nabla u|}\right) = 0, \lambda = \frac{\sigma^2}{\mu}$$

This is a non linear elliptic equation, not well defined when $|\nabla \mu|=0$. This problem is usually fixed by replacing $|\nabla \mu|$ by $\phi(|\nabla \mu|^2)$ where $\phi(s^2) = \sqrt{s^2+\epsilon^2}, \epsilon > 0$ small. The new equation to solve is then:

$\chi(\mu-\mu_0) - 2\lambda div(\phi'(|\nabla \mu|^2)\nabla\mu) = 0$

In order to cope with the non linearity, a fixed-point strategy is used for estimating the $\phi'(|\nabla \mu|^2)$. This leads to the following resolution algorithm:

---
1. Set $\beta^0(x) \equiv 1$
2. For i = 0...N do
   Compute the solution $u^i$ of the linear PDE
   $\chi(u^i - u_0) - 2\lambda div(\beta^i \nabla u^i) = 0$     (*)
   Set $\beta^{i+1} = \phi'(|\nabla u^i|^2)$
3. Output $u^N$
---

Each linear equation (*) is made discrete and solved directly as follows. Given a pixel location $S \in R$, denote by $v(s)$ its 4-neighbourhood. If $r \in v(s)$, then $$\frac{r+s}{2}$$

will denote the mid point between r and s. The discretization of the divergence is performed using central differences with half grid steps. Then, skipping the superscripts i, at pixel location s equation (*) is made discrete as:

$$\chi_s(u_s - u_{0s}) - 2\lambda \sum_{r\in v(s)}\beta\frac{r+s}{2}(u_r - u_s) = 0$$

with boundary conditions incorporated as $\mu_r = \mu_x$ whenever r falls out of R. The resulting system (for all $s \in R$) is solved by a Gauss-Seidel iterative scheme, which, at a given iteration reads For all $s \in R$ do $$u_s \leftarrow \frac{\chi_s u_{0s} + 2\lambda \sum_{r\in v(s)}\beta_{\frac{r+s}{2}}u_r}{\chi_s + 2\lambda \sum_{r\in v(s)}\beta_{\frac{r+s}{2}}}$$

where the symbol ← means "replace the old value by the new one". The iterative process is stopped after a convergence criteria, which is reached when the change in $\mu_x$ falls beneath a certain threshold, has been fulfilled or after a fixed number of iterations. Note that it can be seen as a local lowpass filtering process—the filter coefficients are positive and their sum is 1—biased toward the original value $\mu_0 s$ when $\chi_s = 1$.

The coefficient $\beta_{r+s/2}{}^i$ can be made discrete as follows:

If $s=(j,k), r=(j-1,k)$, it is required from the definition of $\beta^i$ to compute $|\nabla \mu^{i-1}|_{j-1/2,k}$. The x-derivative is approximated by a standard half grid step central difference, centered at $$j - \frac{1}{2}, k.$$

The y-derivative is interpolated using the central differences at (j,k) and at (j−1,k), so that $$|\nabla u^{i-1}|^2_{j-\frac{1}{2},k} \approx (u_{jk} - u_{j-1k})^2 + \frac{1}{16}\begin{pmatrix}u_{jk+1} - u_{jk-1} + \\ u_{j-1k+1} - u_{j-1k-1}\end{pmatrix}^2$$

Although it can be proven that a minimiser $\bar{\mu}^0$ always exists under reasonable conditions, it might fail to be unique. It is therefore necessary to specify a good starting value for $\bar{\mu}$ for the inpainting algorithm as it allows for faster convergence. Outside the inpainting domain $\Omega \bar{\mu}^0(x,y) = \mu_0(x,y)$ and inside $\Omega, \bar{\mu}^0(x,y)$ is drawn from a Gaussian distribution with mean and variance corresponding to the mean and variance of $\mu_0$ outside $\Omega$.

For harmonic inpainting, a Gaussian distribution is assumed for the prior probability $$p(u) = c_2 e^{-\sum_{c\in R}\frac{|\nabla u(c)|^2}{2\mu^2}}$$

where $c_2$ again is a normalising constant and $\mu$ is the standard deviation. The energy term can then be expressed as $E(\mu) = \int_R \chi(\mu-\mu_0)^2 dx + \lambda \int_R |\nabla\mu|^2 dx,$ where χ denotes the function χ(x)=0 if x∈Ωχ(x)=1 otherwise, and $$\lambda = \frac{\sigma^2}{\mu^2}.$$

A third form of inpainting, average inpainting, constitutes the simplest form of inpainting, where Ω is filled homogeneously with the value S resulting from averaging over the immediate boundary of Ω according to $$S = \frac{1}{n}\sum_{i=1}^{n} t_i,$$

where n is the number of boundary pixels and t the respective pixel value.

Figure 10:
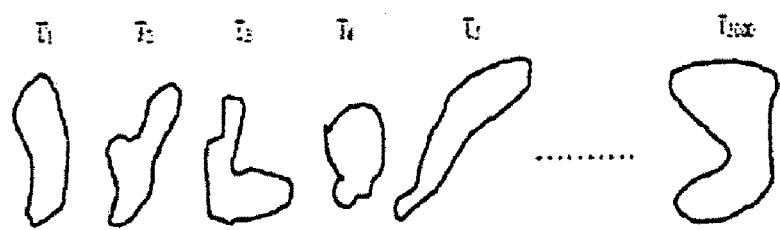
FIG. 10 shows a selection of examples of the 3000 randomly chosen templates used for the respective inpainting schemes.

In order to estimate how well the individual inpainting techniques perform on x-ray images, 3000 templates of calcification shape were chosen at random from manual annotations, as shown in FIG. 10. Algorithm 1 below describes how each template is placed at a randomly chosen aorta, and how the standard deviations of the pixelwise differences between the inpainted and original areas are calculated.

---
Algorithm 1 Background Estimation
---
1. Let A = number of pixels in an area circumscribed by a template
2. For i = 1...3000 do
   randomly choose an area template
   randomly choose an image [1:80]
   randomly choose a non-calcified aorta segment ([1:7], 4 lumbar segments and 3 intervertebral spaces) large enough to centre the area template in
   For c = 1...3 do
     inpaint the area circumscribed by the area template ([1;:3], TV, Harmonic, and Average inpainting)
     calculate the pixelwise differences between inpainted and original area
     take the standard deviation of the pixelwise differences and multiply by √A
3. calculate the regression curves through the sorted standard deviations
---

Figure 11:
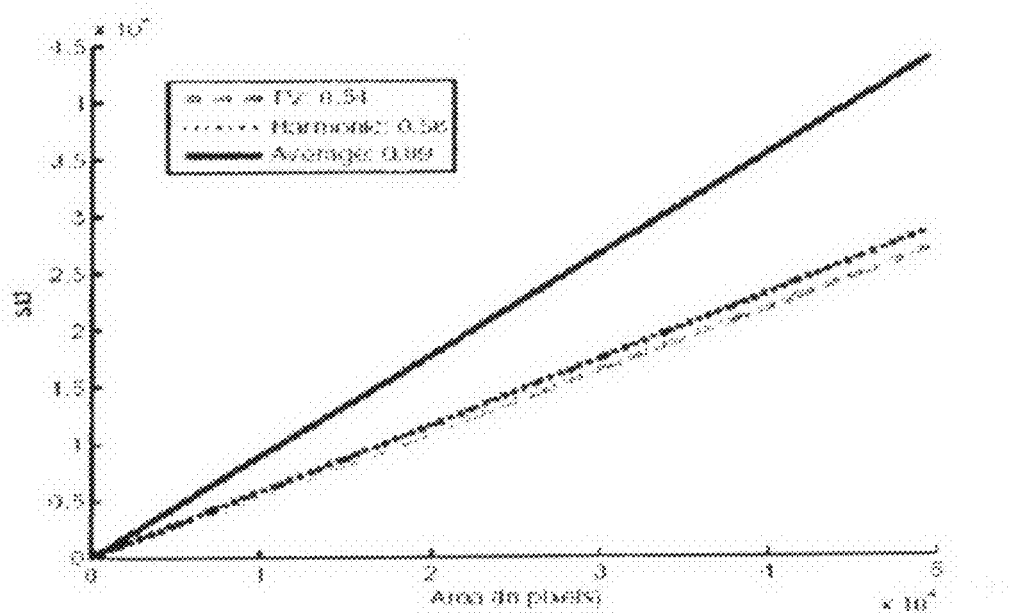
FIG. 11 shows the regression lines in standard deviation against area in number of pixels for the three different inpainting methods.

FIG. 11 shows regression lines through the calculated standard deviations. The regression lines express the standard deviations in the total pixelwise intensity difference for the three inpainting methods as a function of area-size.

Visual inspection of the initial experiments with inpainting of calcified areas made it clear that the inpainting procedures were biased by minute calcific deposits just outside the annotated areas. These calcific rests were missed by the physician and became apparent only when zooming into pixel-level. Since the inpainting methods rely entirely on boundary information, the annotated areas require expansion to avoid faulty results—caused by the small calcific deposits.

The signal-to-noise ratio (SNR) is therefore calculated for each pixel along the immediate boundary of the calcified area according to $$SNR = \frac{I_{inp} - I_{orig}}{std \times area},$$

where $I_{inp}$ denotes the inpainted image, $I_{orig}$ the original image, std the standard deviation of the estimated noise level, and area the number of pixels in Ω. The inpainting process for each calcified area of an image is iterated so that each area may be expanded in order to yield the maximum signal-to-noise ratio. In an idealistic system, the maximum signal-to-noise ratio would be achieved at an optimum time when all calcifications were included within the boundary of the inpainted region. In reality, however, the maximum signal-to-noise ratio is deemed to have been reached when the rate of increase of the signal-to-noise ratio reaches a pre-determined level. This pre-determined level is the point at which the rate of increase of the signal to noise ratio becomes insignificant. This point will be reached when the boundary of the region of inpainting encompasses nearly all minute calcifications.

Figure 12:
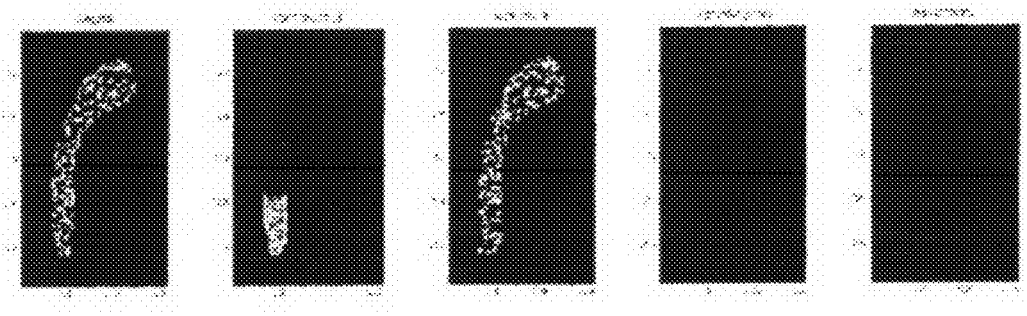
FIG. 12 shows an example of Algorithm 2 of the present invention run on a test image.

The mechanism is illustrated in the below algorithm and the results are shown on FIG. 12 on a test image.

---
Algorithm 2 Pixelwise expansion scheme:
---
1. let N = number of calcified areas in image
2. let B = number of pixels in an isocurve
3. let p denote a pixel
4. For i = 1...N do
     inpaint Ω
     calculate SNR
     while SNR not max do
       calculate outer distance map
       find next isocurve
       For j= 1...B do
         expand Ω by $p_j$
         inpaint and calculate SNR
         if SNR is increased, include $p_j$
       inpaint new Ω
       calculate new SNR
5. output SNR.
---

Figures 13, 14:
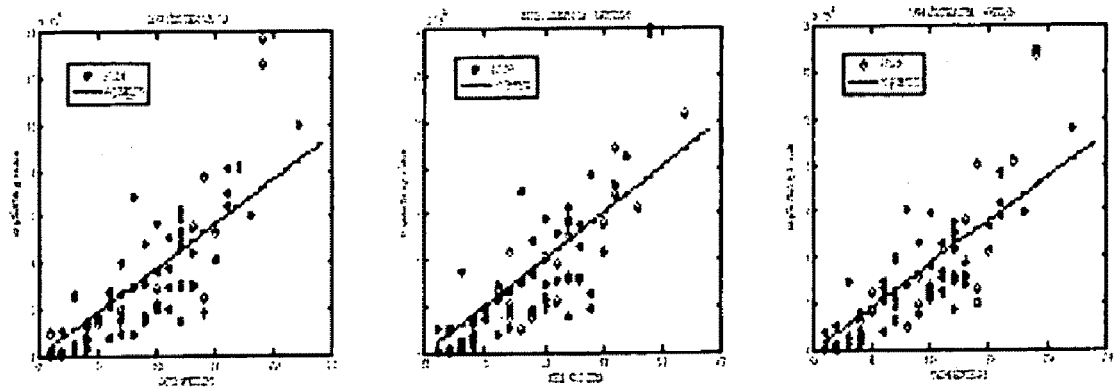
FIG. 13 shows a table displaying p-values resulting from paired t-tests.
FIG. 14 shows comparative inpainting scores for the respective inpainting methods.

Using this iteration scheme, it can be seen from FIG. 13 that TV inpainting produced the least error per pixel and harmonic inpainting follows closely. Average inpainting performed the worst. Paired t-tests performed on the background data showed significant performance differences for TV vs. Average inpainting (p<0.0001) and Average vs. Harmonic inpainting (p<0.0001). There seems to be, however, no significant different for TV vs. Harmonic inpainting (p=0.3506).

Having computed a function for the error in background estimation with respect to the area, the mechanics of Algorithm 2 were tested on a test image. FIG. 12 shows how Algorithm 2 detects the majority of the boundary pixels that should be included in the inpainting area of the test image and thus removes the bias from the inpainting procedure. Having seen that Algorithm 2 performs satisfactorily on a test image, 77 calcified images were subjected to the algorithm. In each image, all the calcified areas were expanded and finally inpainted using the different inpainting techniques. For each image, the pixelwise differences between the original and inpainted images were summed to provide a new calcium score.

To assess the quality of the method, the scores were plotted against the 24-score of the prior art procedure—as shown in FIG. 14. From the plots in FIG. 14 it is apparent that the present method offers more possibility for discerning the different stages of plaque development than the previous known methods. In many cases, where the previous standard yields the same score for a number of images, the present method results in a considerable difference. The correlation co-efficients between the respective inpainting methods and the official 24-score show a reasonable correlation, but the new score is able to discern subtle differences, whereas the standard score is not.

FIG. 14A shows the 24-score versus the total differences resulting from TV inpainting. FIG. 14B shows the 24-score versus the total differences resulting from Harmonic inpainting and the FIG. 14C shows the 24-score versus the total differences resulting from Average inpainting.

Various outliers can be seen in each of the graphs where, in spite of a general correlation, some unexpected numbers are produced.

Figure 15:
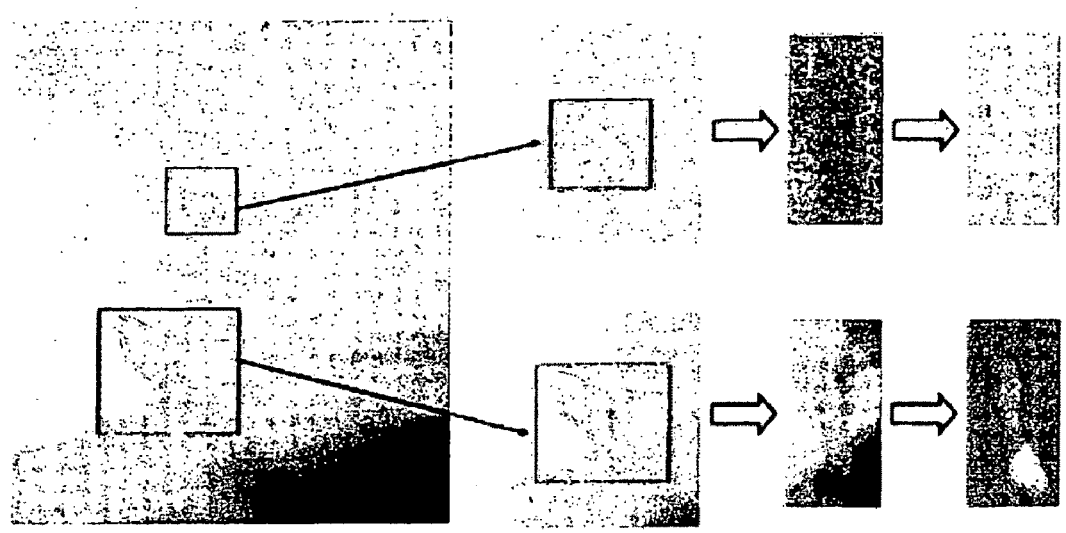
FIG. 15 shows an image sequence of the present invention in use.

A further example is shown in FIG. 15 where the most extreme outlier of the data set is shown. This particular outlier scores a total of 2978536 (TV) on the calcification scale even though only two areas of normal size are detected. Looking at the differences between the original and the inpainted subimages however, leads to the conclusion that only plaque density can be the cause of this unexpectedly high score.

It will be appreciated that modifications to or variations of the embodiments described and illustrated may be made within the scope of this application as set out in the appended claims.

The invention claimed is:

1. A method of deriving a quantitative measure of a degree of calcification of a blood vessel by processing an image of at least a part of the blood vessel containing said calcification, which method comprises:
   taking a starting set of digital data representative of an image of at least part of a blood vessel containing an area of calcification, said area of calcification being set against a background area; and
   using a pre-programmed computational device to:
   (a) detect calcifications in said blood vessel;
   (b) carry out an inpainting method to replace digital data in said starting set of digital data representing the calcification with data extrapolating the background to extend over the area of calcification, and so generating an inpainted set of digital data; and
   (c) compute the difference between the starting set of digital data and the inpainted set of digital data to obtain a result representative of the degree of calcification of the blood vessel.

2. A method as claimed in claim 1, wherein the step of detecting calcifications in the blood vessel includes: predicting the location of the blood vessel;
   based on this prediction and a prior model of calcification distribution in such a blood vessel, calculating the probability of calcifications being located at a position within the blood vessel; and using these calculations to estimate the location of an area of calcification in the blood vessel.

3. A method as claimed in claim 2, further comprising the preliminary steps of estimating a boundary of the area of calcification conducted after said detecting of calcifications and prior to said inpainting, wherein the step of inpainting comprises replacing digital data within the boundary with data extrapolating the background outside the boundary to extend over the area within the boundary.

4. A method as claimed in claim 3, further comprising:
   calculating a signal to noise ratio along the boundary of the calcification between the inpainted set of digital data and the starting set of digital data;. increasing the area within the boundary, and repeating the step of calculating the signal to noise ratio along the boundary; and repeating the steps of increasing the area within the boundary and then calculating the signal to noise ratio between the inpainted set of digital data and the starting set of digital data along the boundary until the rate of increase in the signal to noise ratio reaches a pre-determined level.

5. A method as claimed in claim 4, further comprising calculating the average intensity difference between the inpainted set of digital data and the starting set of digital data, wherein the difference is representative of the degree of calcification of the blood vessel.

6. A method as claimed in claim 1, wherein the method of inpainting is TV inpainting.

7. A method as claimed in claim 1, wherein the method of inpainting is harmonic inpainting.

8. A method as claimed in claim 1, wherein said blood vessel is an artery.

9. A method as claimed in claim 8, wherein said artery is an aorta.

10. A pre-programmed computational device as claimed in claim 1, wherein the method of inpainting is TV inpainting.

11. A pre-programmed computational device programmed for:
   (a) receiving a set of digital data representative of an image of at least part of a blood vessel containing an area of calcification set against a background area;
   (b) detectinq calcifications in the blood vessel;
   (c) inpainting the image to replace digital data in said set of digital data representative of the blood vessel with data extrapolating said background to extend over the area of calcification;
   (d) using an inpainting method to replace digital data in said starting set of digital data representing the calcification with data extrapolating the background to extend over the area of calcification to generate an inpainted set of digital data;
   (e) computing the difference between the starting set of digital data and the inpainted set of digital data to obtain a result representative of the degree of calcification of the blood vessel; and
   (f) outputting the said quantitative measure.

12. A pre-programmed computational device as claimed in claim 11, further programmed for predicting the location of the blood vessel;
   based on this prediction, calculating the probability of calcifications being located within the blood vessel; and
   using these calculations to estimate the location of an area of calcification in the blood vessel.

13. A pre-programmed computational device as claimed in claim 12, further programmed for estimating a boundary of the area of calcification, wherein the step of inpainting comprises replacing digital data within the boundary with data extrapolating the background outside the boundary to extend over the area within the boundary.

14. A pre-programmed computational device as claimed in claim 13, further programmed for:
   calculating a signal to noise ratio along the boundary of the calcification between the inpainted set of digital data and the starting set of digital data;
   increasing the area within the boundary, and repeating the step of calculating the signal to noise ratio along the boundary; and
   repeating the steps of increasing the area within the boundary and then calculating the signal to noise ratio between the inpainted set of digital data and the starting set of digital data along the boundary until a maximum signal to noise ratio is reached.

15. A pre-programmed computational device as claimed in claim 14, further programmed for calculating the average intensity difference between the inpainted set of digital data and the starting set of digital data, wherein the difference is representative of the degree of calcification of the blood vessel.

16. A pre-programmed computational device as claimed in claim 11, wherein the method of inpainting is harmonic inpainting.

17. A pre-programmed computational device as claimed in claim 11, wherein the blood vessel is an artery.

18. A pre-programmed computational device as claimed in claim 17, wherein the artery is an aorta.

19. An instruction set as claimed in claim 18, wherein the method of inpainting is TV inpainting.

20. A instruction set as claimed in claim 18, wherein the method of inpainting is harmonic inpainting.

21. An instruction set as claimed in claim 18, wherein said blood vessel is an artery.

22. An instruction set as claimed in claim 21, wherein said artery is an aorta.

23. An instruction set for enabling generation of a quantitative measure of a calcification from an image of at least part of a blood vessel, the instruction set comprising instructions for:
    detecting calcifications in the blood vessel;
    inpainting the image to replace digital data in said set of digital data representative of the blood vessel with data extrapolating said background to extend over the area of calcification;
    using an inpainting method to replace digital data in said starting set of digital data representing the calcification with data extrapolating the background to extend over the area of calcification to generate an inpainted set of digital data;
    computing the difference between the starting set of digital data and the inpainted set of digital data to obtain a result representative of the degree of calcification of the blood vessel; and
    outputting the said quantitative measure.

24. An instruction set as claimed in claim 23, further comprising instructions for: predicting the location of the blood vessel;
    based on this prediction, calculating the probability of calcifications being located within the blood vessel; and using these calculations to estimate the location of an area of calcification in the blood vessel.

25. An instruction set as claimed in claim 24, further comprising instructions for estimating a boundary of the area of calcification, wherein the step of inpainting comprises replacing digital data within the boundary with data extrapolating the background outside the boundary to extend over the area within the boundary.

26. An instruction set as claimed in claim 25, further comprising instructions for:
    calculating a signal to noise ratio along the boundary of the calcification between the inpainted set of digital data and the starting set of digital data; increasing the area within the boundary, and repeating the step of calculating the signal to noise ratio along the boundary; and repeating the steps of increasing the area within the boundary and then calculating the signal to noise ratio between the inpainted set of digital data and the starting set of digital data along the boundary until a maximum signal to noise ratio is reached.

27. An instruction set as claimed in claim 26, further comprising instructions for calculating the average intensity difference between the inpainted set of digital data and the starting set of digital data, wherein the difference is representative of the degree of calcification of the blood vessel.

28. A method of detecting calcifications in a blood vessel for use in the derivation of a quantitative measure of a degree of calcification of a blood vessel by processing an image of at least part of the blood vessel containing the calcification, which method comprises, in a pre-programmed computational device:
    predicting the location of the blood vessel;
    based on this prediction and a prior model of calcification distribution in such a blood vessel, calculating the probability of calcifications being located at a position within the blood vessel; and
    using these calculations to estimate the size and location of an area of calcification in the blood vessel.

29. A method of deriving a quantitative measure of a degree of calcification of a blood vessel by processing an image of at least a part of the blood vessel containing said calcification, which method comprises:
    taking a starting set of digital data representative of an image of at least part of a blood vessel containing an area of calcification, said area of calcification being set against a background area; and
    using a pre-programmed computational device to:
    (a) carry out an inpainting method to replace digital data in said starting set of digital data representing the calcification with data extrapolating the background to extend over the area of calcification, and so generating an inpainted set of digital data; and
    (b) compute the difference between the starting set of digital data and the inpainted set of digital data to obtain a result representative of the degree of calcification of the blood vessel.

* * * * *